UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BINDING AGENT.

1,311,216.  Specification of Letters Patent.  Patented July 29, 1919.

No Drawing.  Application filed June 22, 1917. Serial No. 176,279.

*To all whom it may concern:*

Be it known that I, CARLETON ELLIS, a citizen of the United States, and a resident of Montclair, in the county of Essex and State of New Jersey, have invented certain new and useful Improvements in Binding Agents, of which the following is a specification.

This invention relates to a binding material prepared from waste sulfite cellulose liquor and contains matter derived from my copending applications Serial No. 779,516 filed July 17, 1913, and 757,301 (now Patent 1,246,805).

My invention specifically relates to the production of a binder consisting of, or containing, waste sulfite cellulose liquor solids in the form of a powder or granular fragmentary material in such a condition as to be readily or substantially soluble in water so that the material may be reduced or dissolved in water to make a solution of the desired density or viscosity. Waste sulfite cellulose liquor when dried to a solid material according to any of the old processes, and without proper precautions not infrequently exhibits a tendency to undergo undesirable changes which render it insoluble or prone to become insoluble in storage or to unduly absorb moisture, becoming sticky, lumpy and compacted or otherwise modified due to atmospheric or aging influences.

My invention is particularly directed to the production of a stable dry composition or product comprising sulfite cellulose waste liquor solids, such binder being sufficiently stable so that it may be packed in barrels, such as flour barrels; which, of course, are more or less pervious to the air and in this condition the product may be shipped or stored and thus exposed to the air for weeks or even months without becoming insoluble to any material extent and in the preferred form of the invention with advantageous qualities as regards relative resistance to moisture which would render it highly useful for shipment in humid climates. The sulfite liquor product may be prepared by evaporating the liquor in an acid state and to this end it is desirable to reduce the acidity of the liquor at the beginning, after, or during the course of the concentration. This may be brought about by the addition of a quantity of alkali, lime being efficient for the purpose, but soda or other alkalis may be used if desired, such alkali being added in such amount as to reduce the acidity, more or less, but preferably to about one-half (and preferably to not much below this amount) the original normal acidity, producing what may be termed, a semi-acid material.

In the drying or concentration of ordinary (unneutralized) or partly neutralized sulfite waste liquor, volatile acids contained in the liquor, such as dissolved sulfur dioxid, will normally be vaporized and accordingly removed from the liquor. In referring herein to the acidity of sulfite waste liquor, it is accordingly advisable to distinguish between that portion of the acidity of the liquor, which is caused by the presence of non-volatile substances (referred to as "fixed acidity"), and that portion of the acidity which is caused by the presence of dissolved $SO_2$ and other relatively volatile substances which will be normally vaporized, and hence removed from the liquor during concentration and evaporation (referred to as "volatile acidity").

Instead of concentrating to a syrupy body of say 30° Bé, I may carry the concentration much farther, removing preferably almost the entire content of water, that is to say, dehydrating the material sufficiently at least to produce a solid form. This dehydration may be carried out in the presence of oxygen, small quantities ordinarily being sufficient so as to produce oxidation of the sulfite liquor during the drying operation. It is usually customary to concentrate sulfite liquor in vacuum pans in the absence of air but in the present case in the preferred form of the invention a regulated degree of oxidation is desirably produced by drying or desiccating in the presence of small quantities of oxygen. This for example, may be carried out by drying in an atmosphere of reduced oxygen content. While I may use such semi-acid material as aforesaid, I do not wish to limit myself strictly to such a product but may use various other forms of the sulfite liquor suitable for the present purpose.

As stated in Serial No. 757,301 the sulfite liquor may be dried in an atomizing system which yields the solids thereof in a pulverulent condition, or in other cases the liquor may be dried to a solid and ground to a powder. Preferably I carry out the drying in part at least by atomization, in which case contact with oxygen contained in the drying gases produces a slight degree of oxidation which may be referred to as a "quick aging" and gives in a cheap and effective manner valuable properties, such as stability to the product; such product constitutes one form of material embraced within the present invention.

In its preferred form the product is a fine granular or pulverulent material and is satisfactorily soluble in water. Although the semi-acid slightly-oxidized material is originally or initially soluble and stable in the dry form when made in accordance with the preferred procedure hereof, such product has the property of becoming more or less insoluble from protracted exposure to air and moisture so that it may be used as a binder for road beds and road surfaces or for making briquets with coal, iron ore, sawdust, mineral fillers, talc, magnesite, sand, crushed rock, fiber, asbestos, culm and the like. It may also be used as a core compound and for other purposes for which a binding substance is desired. Likewise it may be applied as a tanning agent and such product, has the advantage of ease of shipment as a dry powder in contrast to the difficulties of shipping and handling syrup sulfite liquors.

Fillers such as talc, kieselguhr, fullers' earth and the like may be added to the partially concentrated liquor so as to form a nucleus during the concentration to dryness and also weight the particles as may be desired. Thus the liquor may be partially concentrated in vacuum pans or any other suitable concentrating apparatus, a filling material such as kieselguhr added and the evaporation continued in heated air containing a reduced content of oxygen so as to produce the slightly oxidized product and bring about the evaporation of the moisture to yield the dry material. This thus involves a two stage operation of drying which is advantageous under some conditions. Of course, the drying may be carried out in a similar manner without the addition of any filling material.

The sulfite liquor material may be admixed with silicate of soda (sodium silicate) in some cases. Under some circumstances 5 or 10% or so of silicate of soda may be added to the liquor prior to final concentration. It is better to mix the dry pulverized sulfite liquor binder with dry silicate of soda in the form of a powder using various proportions of the latter, 5 to 10% ordinarily being useful, thus affording a mixture of the pulverulent sulfite liquor solids and silicate of soda.

In other cases (as stated in Serial No. 239,882) a quantity of petroleum oil may be added to the binding agent, 10 to 15% of petroleum oil, such as asphaltic oil being useful to aid in waterproofing the material. Under some conditions only 3 to 5% of oil, or 1% or so of calcium stearate gives the desired waterproofing effect. The petroleum oil, may for example, be added to the liquor after the latter has been concentrated to a thick syrup when the product may be brought to dryness and if evaporated under conditions giving solid masses of material this may be pulverized to form a powder or if the product is obtained by atomization a granular or finely-divided pulverulent material is directly obtained.

My invention yields a product of a very desirable character for shipping purposes and for ready solubility in water or other aqueous medium and the preferred form as stated is particularly advantageous in view of a desirable tendency to resist the action of atmospheric moisture to a considerable degree so that when stored and packed in containers which allow access of the air, the product is not readily affected to an undesirable extent but answers requirements in this respect in an advantageous manner. A product prepared by the drying by atomization of acid sulfite cellulose waste liquor to yield a pulverulent product of this stable character in which slight oxidation has taken place during drying due to contact with the heated atomizing and drying gases containing less oxygen than is normal in ordinary air is particularly recommended.

Cross reference is here made to my copending cases as follows:

779,516, filed July 17, 1913, (renewed June 13, 1918, Serial No. 239,882) for drying sulfite waste liquor, preferably after the neutralization of a material portion, but not all of its original acidity, for example, by the neutralization of about half of the acidity and then drying the product, and this with or without the addition of silicate of soda or other named materials for the production of specific effects. I also claim therein, products produced by such treatment, 167,332, filed May 8, 1917, for drying and grinding acid sulfite waste liquor, and product thereof, 168,275, filed May 12, 1917, for a solution of dried acid sulfite waste liquor solids, 188,360 filed August 27, 1917, for a particular mode of atomizing, drying and oxidizing the sulfite waste liquor, to oxidize the least stable portion of the solid contents thereof. This case includes claims to the specific process herein described.

Cross reference is also made to shaped products and to the production thereof by the use of the product claimed herein in my copending cases as follows: 161,441, filed April 30, 1917; 176,280, filed June 22, 1917; and 186,481, filed August 16, 1917, and to a mixture of the present product with lime or equivalents, claimed in 201,807 filed November 13, 1917.

What I claim is:—

1. Sulfite liquor solids, of an acid character, dried by atomization.

2. Sulfite liquor solids, of an acid character but having an acidity materially less than that of the raw liquor from which said solids were produced, and being dried by atomization.

3. As a binding agent, acid sulfite cellulose waste liquor solids in pulverulent form and slightly oxidized condition, said product being water-soluble and being substantially resistant to atmospheric influences for an indefinite period.

4. As a binding agent, sulfite cellulose waste liquor solids in a pulverulent form and slightly oxidized condition, soluble in water.

5. As a binding agent, atomized sulfite cellulose waste liquor solids of an acid character, in a pulverulent form and oxidized condition.

6. A binder in a powder form comprising slightly oxidized waste cellulose sulfite liquor solids dried by atomization, said powder being of an acid character, and when packaged in containers pervious to air being relatively stable in storage, and having the property when mixed with bulking material of becoming substantially insoluble on protracted exposure to air and moisture.

7. A pulverulent form of acid waste sulfite cellulose liquor solids of partially reduced acidity, in a slightly oxidized, water-soluble, relatively stable condition.

8. A pulverulent form of waste sulfite cellulose liquor solids in an oxidized but water-soluble condition.

9. Waste sulfite cellulose liquor acid solids dried by atomization and admixed with an oil.

10. As a binding agent atomized dried sulfite cellulose waste liquor solids in a slightly oxidized acid condition, admixed with a waterproofing agent.

11. As a briqueting agent or binder, atomized oxidized acid sulfite cellulose waste liquor solids in a dry pulverulent form, soluble in water and relatively stable.

12. As a briqueting agent or binder, atomized oxidized sulfite cellulose waste liquor acid solids in a dry water-soluble form.

13. A binder composition comprising solid oxidized constituents of waste sulfite cellulose liquor which has its normal acidity reduced about one-half.

14. As a binding agent, a finely divided, slightly oxidized, air-stable, substantially non-hygroscopic, solid, dry product, containing sulfite cellulose waste liquor solids in a somewhat acid state.

15. As a binding agent, atomized sulfite cellulose waste liquor solids in a dry pulverulent form, acid in reaction.

16. As a binding agent, atomized sulfite cellulose waste liquor solids containing a substantial proportion but substantially less than all of the acidity of normal sulfite waste liquor, said material existing as a substantially dry product.

17. As a binding agent, pulverulent atomized sulfite liquor solids, slightly oxidized, but readily soluble and air-stable.

CARLETON ELLIS.

Copies of this patent may be obtained for five cents each, by addressing the "Commissioner of Patents, Washington, D. C."